United States Patent [19]

Brown et al.

[11] Patent Number: 4,585,813

[45] Date of Patent: * Apr. 29, 1986

[54] AQUEOUS COATING COMPOSITION COMPRISING SELF-EMULSIFIABLE ESTER OF EPOXY AND ACID CONTAINING ADDITION POLYMER AND METHOD OF ITS PREPARATION

[75] Inventors: George L. Brown, Scotch Plains, N.J.; Miksa de Sorgo, McMurray, Pa.; Arthur T. Spencer, New Providence, N.J.

[73] Assignee: SCM Corporation, New York, N.Y.

[*] Notice: The portion of the term of this patent subsequent to Nov. 13, 2001 has been disclaimed.

[21] Appl. No.: 472,206

[22] Filed: Mar. 10, 1983

Related U.S. Application Data

[63] Continuation of Ser. No. 221,641, Dec. 31, 1980, abandoned, which is a continuation-in-part of Ser. No. 95,738, Nov. 19, 1979, abandoned, which is a continuation-in-part of Ser. No. 914,471, Jun. 12, 1978, abandoned.

[51] Int. Cl.$^4$ .......................... C08K 3/20; C08G 59/00
[52] U.S. Cl. .................... 523/409; 525/119; 525/530
[58] Field of Search ............ 523/409, 404, 412; 525/119, 530

[56] References Cited

U.S. PATENT DOCUMENTS

| | | | |
|---|---|---|---|
| 3,028,359 | 4/1962 | Gaylord | 260/45.2 |
| 3,222,420 | 12/1965 | Heppolette | 260/33.4 EP |
| 3,536,641 | 10/1970 | Sekmakas et al. | 260/22 |
| 3,943,187 | 3/1976 | Wu | 260/29.6 NR |
| 3,945,963 | 3/1976 | Levine et al. | 260/29.6 NR |
| 4,029,620 | 6/1977 | Chen | 260/29.6 NR |
| 4,126,596 | 11/1978 | Schimmel et al. | 260/29.6 NR |
| 4,212,781 | 8/1980 | Evans et al. | 260/29.4 UA |
| 4,247,439 | 1/1981 | Matthews et al. | 260/29.6 NR |
| 4,285,847 | 8/1981 | Ting | 260/29.2 EP |
| 4,289,674 | 9/1981 | Christenson | 260/29.6 NR |
| 4,302,373 | 11/1981 | Steinmetz | 260/29.3 |
| 4,308,185 | 12/1981 | Evans et al. | 260/29.2 EP |

Primary Examiner—Paul Lieberman
Assistant Examiner—John F. McNally
Attorney, Agent, or Firm—Thomas M. Schmitz

[57] ABSTRACT

Non-gelled compositions containing hydroxy ester copolymer having carboxyl groups and substantially free of oxirane groups and the method of making them are disclosed which are the esterification reaction product of (A) acidic addition copolymer; and
(B) epoxy resin including aromatic polyether containing oxirane groups in which the epoxy resin comprises at least 50% of the total resin solids and contains insufficient oxirane groups to react with all of the carboxyl groups in the copolymer; in which esterification is conducted after treatment of the addition copolymer with amine in an amount sufficient to neutralize at least 5% of the carboxyl group in the copolymer. The resulting composition is neutralized with amine, is self-emulsifiable in water and is useful for coatings, e.g., for cans.

2 Claims, No Drawings

AQUEOUS COATING COMPOSITION COMPRISING SELF-EMULSIFIABLE ESTER OF EPOXY AND ACID CONTAINING ADDITION POLYMER AND METHOD OF ITS PREPARATION

CROSS-REFERENCE TO RELATED APPLICATION

This application is a continuation of Ser. No. 221,641 filed Dec. 31, 1980, now abandoned, which in turn is a continuation-in-part of Ser. No. 095,738, filed Nov. 19, 1979 which in turn is a continuation-in-part of Ser. No. 914,471 filed June 12, 1978, both now abandoned. Both applications are incorporated herein by reference in entirety.

The invention disclosed and claimed in this application is an improvement over the invention disclosed and claimed in the application of G. L. Brown and A. T. Spencer, Ser. No. 095,682 filed Nov. 19, 1979, now abandoned, entitled "AQUEOUS COATING COMPOSITION COMPRISING SELF-EMULSIFIABLE ESTER OF EPOXY AND ACID CONTAINING ADDITION POLYMER."

BRIEF DESCRIPTION OF THE INVENTION

This invention relates to aqueous emulsion compositions having improved stability, and to the method of their preparation. In particular, the compositions of this invention are mixtures, self-emulsifiable in water, comprising a non-gelled hydroxy ester copolymer containing carboxyl groups and substantially free of oxirane functionality. The hydroxy-ester copolymer is the esterification reaction product of an acidic addition copolymer and at least 40% by weight of an aromatic epoxy resin. The acidic addition copolymer is a solution copolymer of $\alpha,\beta$-monoethylenically unsaturated monomers comprising at least about 20% of monoethylenically unsaturated carboxylic acid, based on the total weight of monomers. The epoxy resin is an aromatic polyether which contains sufficient oxirane groups to provide a ratio of oxirane groups to carboxyl groups in the acidic copolymer of from 1:2 to 1:20. The esterification reaction of the acidic addition copolymer and the epoxy resin is conducted in the presence of an amine sufficient to neutralize 5% of the carboxyl groups in the addition copolymer. The amine acts as an esterification catalyst. A sufficient proportion of the carboxy groups in the copolymer epoxy resin hydroxy ester are reacted with a base to render the composition self-emulsifiable in water. The resulting compositions are useful as coatings, for example, as can coatings which are cured by baking. An aminoplast or phenoplast resin in small proportion may be added to enhance the cure on baking.

DETAILED DESCRIPTION OF THE INVENTION

Epoxy resins contain a plurality of aromatic groups joined together by ether linkages, and provide excellent physical and chemical properties. It has been difficult to employ such resins in aqueous media because they lack storage stability. This is desirable and of particular importance when spray application is contemplated, especially for the interior of sanitary cans. The slightest change in the pH of the aqueous composition as a result of hydrolytic instability results in a marked change in the viscosity and application properties of the coating.

To obtain aqueous coatings of proper resin solids content and viscosity, it has often been necessary in the trade to employ an emulsion system in which a water immiscible component is suspended in an aqueous continuous phase with an emulsifying agent. Such emulsion systems are intrinsically unpredictable since the particle size of the emulsion will vary with the agitation of the composition. This invention provides self-emulsifiable compositions in which the particle size of the emulsion is substantially the same regardless of whether high speed agitation is used or whether the mixture with water is barely stirred.

It has been found that aqueous coating composition having the desirable characteristics associated with epoxy resins are obtained by reacting the epoxy resin with an addition polymer containing free carboxyl groups to form the ester of the epoxy and the addition polymer. However, when a desirably high amount of epoxy comprising 40% by weight or more of the final ester copolymer is used in the esterification reaction with the carboxyl containing copolymer, difficulty with gelling of the composition is encountered. Gelling manifests itself in the formation of an ester copolymer having an undesirably high viscosity which is not usable. It has now been found that gelling can be reduced or eliminated even in copolymers containing epoxy resin in amounts far greater than 40% by weight by introducing amine into the reaction medium in excess of the catalytic amounts of about 0.1 to 0.3% typically used in the prior art for esterification. Although higher amounts of amine catalyst are broadly contemplated in the prior art such larger amounts are rarely used because it has been considered a waste of material. In accordance with this invention, the amine is introduced in an amount sufficient to neutralize at least 5% of the carboxyl groups in the addition copolymer. Preferably, sufficient amine is used to neutralize 10% or more of the carboxyl groups. In any case the amount of amine is also sufficient to avoid gelation with the particular set of reactants involved. Thus, at the same time, the benefits of high epoxy content are obtained and the problems of gelation are avoided.

In the companion application of G. L. Brown and A. T. Spencer certain ester copolymer compositions are disclosed which are prepared by reaction of an addition copolymer containing carboxyl groups and at least 40% of a mixture including epoxy resin and at least 5% by weight of another component which can be defunctionalized epoxy resin. In the related applications a 40% aromatic resin content is achieved but only a portion of the resin is epoxy resin, i.e., it contains oxirane groups, and a portion of the aromatic resin is free of oxirane groups, e.g., epoxy resin defunctionalized by reaction with a phenol or an acid. The method of this invention also enables the production of non-gelled esters of epoxy and acid containing addition polymer where the epoxy comprises a mixture containing at least 40% by weight of an aromatic polyether containing oxirane groups, and an aromatic polyether devoid of oxirane groups. The advantage of this invention is that it enables the production of non-gelled esters of epoxy and acid copolymer where the proportions are such that gelation would occur if small amounts of amine were used in the esterification reaction.

One factor of importance in achieving the best results in accordance with this invention is the employment of epoxy resins having a number average molecular weight ($M_n$) of at least 1,500. Such high molecular weight aromatic polyethers are incompatible with carboxyl-functional addition polymers. Thus, while both materials may be soluble in the same organic solvent, the solutions do not dissolve in one another and tend to separate. While lower molecular weight epoxides yield compatible solutions, the higher molecular weight epoxides provide more desirable properties. Substantially complete esterification of the oxirane groups by the carboxyl groups in the copolymer eliminates the incompatibility of the high molecular weight epoxides and, at the same time, gives the benefits of their better properties.

Still another factor of importance in achieving the optimum results is the use of mixtures of monoepoxides and diepoxides. It is desired to chemically couple together with the carboxyl copolymer as much epoxide as possible. Some of this epoxide is desirably a diepoxide in order to increase the molecular weight and complexity of the final copolymer. However, the more monoepoxide, the more total aromatic polyether can be chemically combined with the carboxyl copolymer. The maximum proportion of diepoxide is subject to many variables and the only limit is the avoidance of gelation. This factor will be defined by the term "non-gelled." The high molecular weight and complexity of the copolymers formed herein lowers the proportion of curing agent needed, resulting in tougher and more impact resistant cured coatings.

A further point of considerable importance in achieving optimum results where aromatic polyether devoid of oxirane groups is present, is the selection of bisphenol-terminated aromatic polyethers as the oxirane-free polyether which finds its way into the discontinuous phase of the emulsion. Bisphenol-terminated aromatic polyethers possess excellent hydrolytic stability in aqueous alkaline medium and give the best properties in the final, cured products. Introduction of the oxirane-free polyether can be accomplished in many different ways, including addition of such a component to epoxy resin or by defunctionalization of the epoxy resin with any of a number of defunctionalizing agents. This invention is not limited to any manner of achieving a mixture containing epoxy and aromatic polyether devoid of oxirane groups.

Another point of importance in achieving the optimum results under this invention where oxirane-free polymer is present is the chemical similarity between the oxirane-free hydroxyfunctional aromatic polyether, and the aromatic polyether epoxide present in the mixture which is reacted with the acidic copolymer. This chemical similarity is believed to contribute to the achievement of a self-emulsifiable composition. As indicated above, these compositions form stable emulsions with water which have a particle size largely independent of the conditions of agitation or storage.

Other and further features of the invention will become apparent from the following discussion of the various components which are combined herein and the manner of combining them.

One main component of the final copolymer composition is an addition copolymer of $\alpha,\beta$-monoethylenically unsaturated monomers comprising at least about 20% of monoethylenically carboxylic acid, based on the total weight of monomers. These copolymers are themselves well known, being unusual in this invention solely because of the large amount of copolymerized carboxylic acid. The balance of the copolymer is preferably nonreactive under the contemplated conditions of polymerization, prereaction with the epoxy resin, and cure, but a small amount of other reactive monomers, e.g., hydroxy monomers such as 2-hydroxy ethyl methacrylate, amide monomers such as acrylamide, and N-methylol monomers such as N-methylol acrylamide, can be used.

The non-reactive monomers are, for example, acrylate and methacrylate esters, such as ethyl acrylate, methyl methyacrylate or isobutyl methacrylate, styrene or vinyl toluene, vinyl acetate, vinyl chloride, vinylidene chloride, acrylonitrile, and the like. Their function is to enhance solvent solubility and film formation.

The carboxyl-functional monomer in large proportion is essential. The preferred minimum proportion is 30% of the weight of the monomers. Methacrylic acid provides the best hydrolytic stability and is very much preferred, but other acids are also useful, such as fumaric acid, acrylic acid, crotonic acid, itaconic acid, and the like. Up to about 80% of the monomers can be carboxyl functional, but the maximum proportion is more generally determined by retention of solvent solubility of the copolymer.

In accordance with this invention the addition copolymer is preformed and amine is added prior to reaction of the addition copolymer and epoxy.

The addition copolymer must be made in solution so that it is non-gelled and organic solvent-soluble.

Aromatic polyethers, and particularly diglycidyl ethers are well known and available in commerce. The usual aromatic polyether backbone of the epoxy resin is based on a bisphenol which defines a pair of phenolic groups joined together through an intervening divalent hydrocarbon. The preferred bisphenols have the formula:

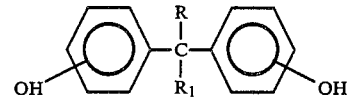

in which R and $R_1$ are hydrogen or alkyl groups containing up to 8 carbon atoms. Bisphenol A is particularly preferred, this compound having the two OH groups in the para position, and R and $R_1$ are each methyl.

The epoxy resins which are used herein possess hydroxy groups in addition to epoxy groups. The higher the molecular weight of the epoxy resin the more hydroxy groups are present. In addition, when the epoxy resin is defunctionalized by reaction with a bisphenol, for example, to reduce the proportion of diepoxide, additional hydroxy groups are provided. These hydroxy groups can participate in the final curing reaction.

Among the common epoxy resins available in commerce are diglycidyl ethers made by reaction of epichlorohydrin with Bisphenol A. Typically, they have a molecular weight in the range of about 350 to 6,000.

Mixtures having a number average molecular weight of at least about 1,500 and containing less than 50% by weight of diglycidyl ethers are preferred for use in this invention. A simple way of providing such mixtures is by reacting a lower molecular weight diglycidyl ether with between 1 and less than 2 molar proportions of a bisphenol. It is essential that the reaction be stopped when the desired degree of defunctionalization is achieved. The reaction may be stopped by lowering temperature or adding the acidic copolymer. This increases molecular weight and provides bisphenol terminal groups. It is especially preferred to use a mixture containing from 3% to about 30% by weight of diglycidyl ethers. The molecular weight of the epoxy resins is normally obtained by calculation.

It is surprising to be able to combine the higher molecular weight epoxy resins preferred herein with preformed copolymers to provide non-gelled compatible compositions. It is also surprising to obtain water dispersible compositions where the proportion of the mixture containing epoxy resin is large. In accordance with this invention 75% by weight and higher of epoxy resin can be reacted with the carboxyl containing addition copolymer without gelation.

As indicated above, the method of this invention is applicable where a mixture containing polyethers with oxirane groups and polyethers devoid of oxirane groups is used such as by defunctionalization of the epoxy resin.

Defunctionalization of the epoxy resin can be performed in various ways instead of by reaction with a bisphenol mentioned previously. For example, phenols other than bisphenols, i.e., monofunctional phenols, can be used. In any case, basic catalysts are normally used in reactions with phenols. Carboxylic acids such as benzoic acid or octanoic acid, can also be used to defunctionalize the epoxy resin, basic catalysts again being appropriate. In addition, alcohols such as octanol, are suitable defunctionalizing agents. The etherification reaction with alcohol is fostered by the presence of a catalyst such as boron trifluoride.

All or part of the component which is free of oxirane groups can be provided by simply adding an appropriate preformed aromatic polyether. That is, the aromatic polyether free of oxirane groups need not be formed in an epoxy defunctionalization reaction as previously described. Similarly, the component containing a single epoxy group, the presence of which is preferred, can be added as a preformed component.

The esterification reaction involving the oxirane groups of the epoxy resin and carboxyl functionality of the addition copolymer is a conventional reaction which is normally carried out in the presence of a small amount of an amine esterification catalyst. An appropriate amine is dimethylamino ethanol, but many others are known such as dimethyl benzyl amine, ethanolamine, diethanolamine and morpholine. Such amines are normally used as esterification catalysts in an amount of from 0.1-0.3% of the materials subjected to esterification but in accordance with this invention the amines are used in greater amounts necessary to neutralize 5% of the acid groups and to avoid gelation. The maximum amount of amine catalyst is not critical, but it is desired to avoid the use of unnecessary excess.

The compositions of this invention form films with reasonably good properties on baking in the absence of any external curing agent. However, from 1-25% of the curing agents such as aminoplast resins, phenoplast resins and mixtures thereof will serve to enhance the cure. With analogous prior art polymers at least 15% of curing agent, based on the total weight of polymer is normally required. While such levels of curing agents are useful with the hydroxy ester copolymers of this invention, this invention is unusual in enabling the achievement of a superior cure using a smaller proportion of curing agent. For example, 2-12% is entirely sufficient to cure films containing the hydroxy ester copolymers of this invention. The advantage in using reduced amounts of curing resin is that the smaller proportion of curing agent needed to provide the desired solvent insolubility results in less brittleness in the cured film.

The preferred curing agents are water dispersible. These are represented by hexamethoxy methyl melamine, or by A-stage phenol-formaldehyde resols. However, the compositions of this invention are emulsions and water dispersibility of the curing agent is not essential.

The curing of analogous compositions by baking, is entirely conventional in the art. Presumably, the methylol groups introduced by the curing agent react with the hydroxy and carboxyl groups present in the copolymer, and with the hydroxy present in the aromatic polyether devoid of oxirane functionality. Acidic curing agents are commonly employed to facilitate the cure, though this is not essential, especially when a phenoplast curing agent is used.

In the preferred compositions, the epoxy resin is a mixture of bisphenolic polyethers, at least 10% of which contain oxirane functionality, and at least 3% of the total bisphenolic polyethers are diglycidyl ethers. As previously indicated, these bisphenolic polyethers are of relatively high molecular weight, possessing number average molecular weight, determined by calculation, of at least 1,500. The acidic copolymer which is combined with the epoxy resin is a solution copolymer of about 30-70% of methacrylic acid, the balance of the monomers being nonreactive as previously defined, said proportions being based on total resin solids. The epoxy resin constitutes from 55-90% of the total resin solids content, and it provides a ratio of oxirane groups to carboxyl groups of from 1:4 to 1:10. From about 30% to about 90% of the carboxyl functionality in the polymer product is reacted with a volatile amine which may be ammonia, or other volatile amine, such as triethylamine or, preferably, dimethylamino ethanol.

The carboxyl-functional copolymers which are preferred generally have a number average molecular weight ($M_n$) in the range of 3,000 to 20,000, preferably 3,000-6,000. Molecular weight can be controlled by monomer content during polymerization, or catalyst concentration, or polymerization temperature, these being known expedients for this purpose. Mercaptan chain termination is preferably avoided especially where sanitary can use is contemplated, as mercaptans have an offensive odor.

Lastly, in the preferred use of the compositions of this invention from about 3% to about 10% of water dispersible aminoplast resin is added to the mixture to assist in cure on baking.

The resins of this invention are solids and are used by dissolution in a volatile organic solvent. A wide variety of solvents are suitable. In general, any solvent which does not interfere with the achievement of an emulsion when the acidic copolymer salts are diluted with water can be used. The point at which an emulsion is achieved is easily observed. It occurs when the aqueous system changes from clear to milky.

Organic solvents of limited water miscibility, such as xylene, toluene, and butanol are useful, and they may be used alone or together with water miscible solvents, such as 2-ethoxyethanol or methyl ethyl ketone.

The aqueous coating compositions of this invention are primarily useful for coating aluminum, tin-plated steel, pretreated metals, steel, or metals coated with the same or different resin compositions, i.e., a second coat. These aqueous compositions also can be used for coating other substrates, such as wood. The most preferred and advantageous use of the coating compositions is for the interior coating of metal containers by spraying, using enough amine for salt formation with from 50% to 90% of the available carboxyl groups, and enough water to provide a final solids content of about 18% to about 25%. After application, the coating is baked for about 5 seconds to about 30 minutes at between 120° C. (250° F.) and about 315° C. (600° F.). A typical bake is for about 2 minutes at about 204° C. (400° F.).

The invention is illustrated in the following non-limiting examples. Proportions are by weight.

EXAMPLE 1

An acrylic copolymer solution is prepared as follows:

|  | Parts by Weight |
|---|---|
| n-Butanol | 2744.0 |
| 2-Butoxyethanol | 1372.0 |
| Deionized Water | 84.0 |
| Styrene | 2448.8 |
| Methacrylic Acid | 874.4 |
| Ethyl Acrylate | 174.8 |
| t-Butylperoxy isopropylcarbonate | 174.8 |
| t-Butylperoxy isopropylcarbonate | 18.0 |

The butyl alcohol, 2-butoxyethanol and water are charged to a 12 liter reactor equipped with a stirrer, reflux condenser, thermometer and nitrogen inlet. A premix is made of the monomers and the first initiator portion. The solvent mixture is brought to the reflux and the premix is metered in at a constant rate over four hours while maintaining reflux. After 30 minutes, the second portion of initiator is added and the polymerization is held at reflux for an additional two hours. The resulting solution has a solids content of 44.6%, an acid number of 159 and a bubble tube viscosity of G at 35% solids in a 2-butoxyethanol.

An epoxy acrylate adduct is formed by reacting an epoxy resin with the above acrylic prepolymer under amine esterification catalysis as follows:

|  | Parts by Weight |
|---|---|
| 2-Butoxyethanol | 14.7 |
| DER 383[1] | 178.8 |
| Bisphenol A | 101.9 |
| Tri-n-butylamine | 7.75 |
| 2-Butoxyethanol | 24.0 |
| Acrylic prepolymer | 415.8 |
| Deionized Water | 44.1 |
| Dimethylaminoethanol | 4.7 |

[1]DER 383 (Dow) - an epoxy equivalent weight 178–186 diglycidyl ether of bisphenol A.

The first four items above are charged to a 5 liter reactor with stirrer, reflux condenser, thermometer and nitrogen inlet. Nitrogen flow is started and the reactants are heated to 130° C. The source of heat is removed during the exotherm, after which 150° C. is maintained until the oxirane content of the reacting polymer falls to 0.30 meq/g. The second amount of 2-butoxyethanol is then added followed by the acrylic prepolymer (containing 0.53 carboxyl equivalent) and the water.

The reaction temperature is adjusted to 94° C. and the dimethylaminoethanol esterification catalyst (0.053/equivalents) is added to neutralize the carboxyl content of acrylic prepolymer 10.0%. The reaction is held at 94° C. for four hours during which time the acid number of the adduct falls by the value indicating complete esterification of the oxirane groups originally present in the epoxy. The resulting epoxy acrylate adduct solution has a bubble tube viscosity of $Z_4$ at 33.5% solids in N-methylpyrrolidone. The above composition is dispersed by increasing the degree of neutralization to 60% with dimethylaminoethanol and adding distilled water under agitation. The dispersion is formulatable by further additions of amine, solvents, curing agents and water into compositions that are suitable for use in coating the interiors of sanitary cans and other substrates.

EXAMPLE 2

The above example is repeated using 47 parts of dimethylaminoethanol as esterification catalyst to neutralize the carboxyl content of the acrylic copolymer 100%. The reaction reaches a constant acid number of 54.6 at the end of two hours indicating esterification has taken place with about 84% of the oxirane content originally present in the reaction mixture. The product is a clear amber syrup that was easily dispersed by addition of water.

EXAMPLE 3

The above example is again repeated using 13.3 parts of 8% zinc naphthenate, a commonly used metallic salt type epoxy esterification catalyst, in place of the catalytic dimethylaminoethanol. During a reaction period of three hours at 94° C. the reaction mixture does not clear and the acid number does not decrease, an indication that no carboxyl/oxirane esterification has taken place. The reaction mixture, when neutralized with 44.8 g of dimethylaminoethanol, does not form a stable dispersion in water.

An acrylic prepolymer solution is prepared as follows:

|  | Parts by Weight |
|---|---|
| Butanol | 2755.2 |
| Methacrylic Acid Monomer | 1197.7 |
| Styrene Monomer | 597.8 |
| Ethyl Acrylate Monomer | 199.5 |
| Benzoyl Peroxide (70%, water wet) | 142.8 |
| 2-Butoxyethanol | 1995.0 |
| TOTAL | 6888.0 |

The butanol is charged to a 12 liter reactor equipped with a stirrer, reflux condenser, thermometer, addition funnel and nitrogen inlet. A premix is made of the monomers and benzoyl peroxide and 20% is added to the reactor. The nitrogen flow is started and the reactor is heated to 93° C. and held at this temperature for 15 minutes. The remaining premix is added uniformly over three hours while maintaining 93° C. After the premix is added temperature is held for two hours to complete the polymerization. The 2-butoxyethanol is then added to dilute the prepolymer. The resulting solution has a solids content of 30%, an acid number of 383 and a viscosity of 2600 centipoise.

An epoxy acrylate polymer solution containing phenolic terminated diluent is prepared as follows:

|  | Parts by Weight |
|---|---|
| Epon 829[1] | 1592.0 |

-continued

|  | Parts by Weight |
| --- | --- |
| Bisphenol A | 1156.4 |
| Methyl i-Butyl Ketone | 144.2 |
| 2-Butoxyethanol | 554.0 |
| 2-Hexoxyethanol | 78.0 |
| Butanol | 153.1 |
| Acrylic Prepolymer Solution | 3205.5 |
| Epon 1009[2] | 2749.3 |
| Dimethylaminoethanol | 144.2 |
| Dimethylaminoethanol | 97.8 |
| TOTAL | 9874.5 |

[1]Epon 829 (Shell) Epoxy Equivalent weight 185–192 diglycicidyl ether of bisphenol A.
[2]Epon 1009 (Shell) Epoxy Equivalent weight 2500–4000 diglycidyl ether of bisphenol A.

The Epon resin, bisphenol A and methyl i-butyl ketone are charged to a 12 liter reactor with a stirrer, reflux condenser, thermometer and nitrogen inlet. Nitrogen flow is started and the reactants are heated to 135° C. The heat input is stopped and the reaction proceeds to raise the temperature to about 170° C. after which the temperature is controlled at 160°–170° C. This temperature is held until the reaction mass has an oxirane content less than 0.004 eq/100 g solids. The 2-butoxyethanol, 2-hexoxyethanol, butanol and acrylic prepolymer (containing 6.57 equivalents of acid functionality) are then added and the temperature is raised to 115° C. The Epon 1009 is added and held at temperature until dissolved. The first portion of dimethylaminoethanol (1.62 equivalents to neutralize the acrylic 24.7%) is added and the reaction is held at 115° C. for one hour to complete the esterification. The reaction turns from opaque to clear in this period and the acid number decreases by an amount equivalent to the oxirane present in the Epon 1009. The remainder of the dimethylaminoethanol is added to aid subsequent dispersion. The epoxy acrylate solution contains no detectable oxirane functionality. It has a non-volatile content of 67%, acid number of 45 and bubble tube viscosity of T-W when diluted with two parts of tetrahydrofuran.

The above epoxy acrylate polymer solution is dispersed as follows:

|  | Parts by Weight |
| --- | --- |
| Epoxy Acrylate Solution | 3423.0 |
| Dimethylaminoethanol | 7.0 |
| Cymel 1156 | 120.0 |
| Deionized Water | 5756.0 |
| 2-Butoxyethanol | 73.0 |
| 2-Hexoxyethanol | 112.0 |
| Butanol | 93.0 |
| TOTAL | 9584.0 |

The epoxy acrylate polymer solution is charged to a dispersion vessel equipped with high speed agitator and reflux condenser. The temperature is adjusted to about 105° C. The dimethylaminoethanol and the Cymel 1156 (a butoxymethylated melamine curing agent, American Cyanamid Company) are added. After uniformity of mixing has been achieved the deionized water is added over approximately one hour under efficient agitation while allowing the temperature to decrease. The remaining solvents are added and stirring is maintained for 20 minutes. A stable dispersion is formed having the following physical properties: 25% solids, 8.4 pH and viscosity of 40 seconds in a #2 Zahn cup. Films of the above are cast on aluminum and tin plate with wire wound bars and baked in a forced air oven at 400° F. for two minutes total time. The dry films are 0.1–0.2 mil thick, are clear and glossy and exhibit excellent properties as shown below.

|  | Aluminum | Tin Plate |
| --- | --- | --- |
| Methyl Ethyl Ketone Double Rubs | 40 | 40 |
| Dry Adhesion | 10 | 10 |
| Pasteurization 45 min at 77° C. (170° F.) | | |
| Blush | 10 | 10 |
| Adhesion | 10 | 10 |
| Wedge Bend Flexibility | 9+ | 5 |

(Rating: 10 = No failure; 0 = Complete failure)

EXAMPLE 5

An acrylic polymer solution is prepared as follows:

|  | Parts by Weight |
| --- | --- |
| n-Butanol | 2205.0 |
| 2-Butoxyethanol | 2205.0 |
| 2-Hexoxyethanol | 415.0 |
| Methacrylic Acid | 1804.8 |
| Styrene | 2481.6 |
| Ethyl Acrylate | 225.6 |
| Benzoyl Peroxide (70% in water) | 322.3 |
| t-Butylperoxyisopropylcarbonate (TBIC) | 30.0 |
| t-Butylperoxyisopropylcarbonate | 30.0 |
| t-Butylperoxyisopropylcarbonate | 30.0 |

The first three items are charged to a 12 liter flask equipped with a stirrer, reflux condenser, thermometer and nitrogen inlet. A premix is made of the monomers and the first initiator portion. The solvent mixture is brought to reflux under a nitrogen blanket and then the premix is metered in at a constant rate over five hours at the reflux. Reflux is held for one hour. The second portion of initiator (TBIC, 30 g) is added and reflux held 1.5 hours. The TBIC addition procedure is repeated two more times to obtain good monomer conversion. The resulting polymer solution has a solids content of 47.7%, acid number of 248 and bubble tube viscosity of R at 35% in 2-butoxyethanol.

An epoxy acrylate adduct is formed by reacting an epoxy resin with the above acrylic prepolymer under amine esterification catalysis as follows:

|  | Parts by Weight |
| --- | --- |
| Ethylene glycol monobutyl ether | 128.8 |
| DER 331[1] | 1175.7 |
| Bisphenol A | 669.7 |
| Tri-n-butylamine | 3.7 |
| Acrylic prepolymer | 1260.0 |
| Deionized Water | 194.3 |
| Dimethylaminoethanol | 82.6 |

[1]DER 331 (Dow) - An epoxy equivalent weight 182–190 diglycidyl ether of bisphenol A.

The first four items above are charged to a 5 liter reactor with stirrer, reflux condenser, thermometer and nitrogen inlet. Nitrogen flow is started and the reactants are heated to 130° C. After exotherm, 150° C. is maintained until the oxirane content of the reacting polymer falls to 0.22 meq/g. The above acrylic prepolymer (containing 2.66 carboxy equivalents) and water are then added.

This mixture is stirred until uniform and the temperature adjusted to 94° C. An amount of dimethylaminoethanol esterification catalyst (0.93 equivalents) is added to neutralize the acrylic acid functionality 35%. The reaction is held at 94° C. for two hours during which time the carboxyl content of the reaction mass falls to 2.36 eq corresponding to carboxyl esterification by 75% of the epoxy oxirane originally present. The epoxy acrylate adduct formed has a solids content of 69.6%, an acid number of 53.4 and a bubble tube viscosity of $Z_3$ at 33.5% solids in N-methyl pyrrolidone.

The degree of neutralization of the above adduct is raised to 48.5% by adding dimethylaminoethanol and it is dispersed using deionized water. The dispersion can be further formulated by additions of solvents, amines, curing agents and water into coatings for finishing sanitary cans, can stock and other useful applications.

We claim:

1. A method of esterifying a solvent-soluble carboxyl-functional polymer with an epoxy resin which is a mixture comprising aromatic polyethers containing oxirane functionality, at least 5% of said aromatic polyethers being constituted by diepoxide, said mixture of aromatic polyethers constituting at least about 40% of the total resin solids content and providing oxirane functionality in a stoichiometric deficiency with respect to carboxyl functionality in said carboxyl-functional polymer of from 1:2 to 1:20, said esterification being carried out in organic solvent medium in the presence of at least about 3% amine, based on the weight of the reactants subjected to esterification, of an amine esterification catalyst and at an elevated temperature appropriate to cause said oxirane functionality to react with said carboxyl functionality until said oxirane functionality is substantially entirely consumed to produce an epoxy resin-carboxyl polymer ester; and providing a colloidal dispersion of said epoxy resin-carboxyl polymer ester in an organic solvent medium.

2. A colloidal dispersion as recited in claim 1 (56) in which said carboxyl-functional polymer is a solution copolymer of monoethylenically unsaturated monomers comprising from 30% to 70% by weight of methacrylic acid.

* * * * *